(12) United States Patent
Li

(10) Patent No.: US 12,431,836 B1
(45) Date of Patent: Sep. 30, 2025

(54) ADJUSTMENT BRACKET FOR SOLAR PANEL AND SOLAR PANEL

(71) Applicant: Jingwei Li, Yiyang (CN)

(72) Inventor: Jingwei Li, Yiyang (CN)

( * ) Notice: Subject to any disclaimer, the term of this patent is extended or adjusted under 35 U.S.C. 154(b) by 0 days.

(21) Appl. No.: 19/183,044

(22) Filed: Apr. 18, 2025

(51) Int. Cl.
*H02S 20/30* (2014.01)
*H02S 20/10* (2014.01)

(52) U.S. Cl.
CPC .............. *H02S 20/30* (2014.12); *H02S 20/10* (2014.12)

(58) Field of Classification Search
None
See application file for complete search history.

(56) References Cited

U.S. PATENT DOCUMENTS

| | | | | |
|---|---|---|---|---|
| 756,486 | A * | 4/1904 | Fleming | A47B 23/043 248/456 |
| 5,228,924 | A * | 7/1993 | Barker | H02S 20/30 136/246 |
| 6,563,040 | B2 * | 5/2003 | Hayden | F24S 25/50 126/600 |
| D565,505 | S * | 4/2008 | Shugar | D13/102 |
| 7,381,886 | B1 * | 6/2008 | Aiken | H02S 20/10 136/246 |
| 8,413,391 | B2 * | 4/2013 | Seery | F24S 25/12 52/173.3 |
| 8,513,514 | B2 * | 8/2013 | Sherman | F24S 40/00 250/203.1 |
| 9,057,546 | B2 * | 6/2015 | Sade | F24S 30/428 |
| 2005/0121594 | A1 * | 6/2005 | Kuo | F16M 11/10 248/676 |
| 2010/0089389 | A1 * | 4/2010 | Seery | F24S 25/12 126/608 |

* cited by examiner

*Primary Examiner* — Steven M Marsh
(74) *Attorney, Agent, or Firm* — JEEN IP LAW, LLC

(57) ABSTRACT

An adjustment bracket for solar panel and a solar panel are provided. The solar panel includes a battery panel, the adjustment bracket includes a fixing member, a support member, a connector, and a locking component. The fixing member is fixedly connected to one side of the battery panel; one end of the support member is rotatably connected to the fixing member, and the other end of the support member is supported on a contact surface; one end of the connector is connected to the battery panel, and the other end of the connector is connected to one side of the connector. A part of the connector that is connected enables a part of the support member to be located between two sides of the connector. The above adjustment bracket can improve the stability of the adjustment bracket and ensure a normal use of the solar panel.

10 Claims, 7 Drawing Sheets

ADJUSTMENT BRACKET FOR SOLAR PANEL AND SOLAR PANEL

TECHNICAL FIELD

The present disclosure relates to the field of solar panel technologies, and in particular, to an adjustment bracket for solar panel and a solar panel.

BACKGROUND

With the development of new energy technologies, solar panels have become an essential choice for people's outdoor activities. Solar panels include flexible solar panels, and the flexible solar panels consist of a battery panel and a support frame. The battery panel has a certain degree of flexibility, but when supported by support frames for use, the middle position of the battery panel is prone to flexible bending, thus, it is difficult to place on ground, which results in poor stability and affecting normal use of flexible solar panels.

SUMMARY

The embodiment of the present disclosure provides an adjustment bracket and a solar panel to solve at least one technical problem mentioned above.

An adjustment bracket for a solar panel according to an embodiment of the present disclosure, the solar panel includes a solar panel, and the adjustment bracket includes:
- a fixing member, which is fixedly connected to one side of the battery panel;
- a support member, one end of the support member is rotatably connected to the fixing member, and the other end of the support member is supported on a contact surface;
- a connector, one end of the connector is connected to the battery panel, and the other end of the connector is connected to one side of the connector; a part of the support member that is connected to the support member enables a part of the support member to be located between two sides of the connector; the connector is configured to restrict one end of the support member from moving away from the fixing member;
- a locking component, which is provided on the connector, and the other end of the connector is connected to one side of the connector through the locking component.

In the above adjustment bracket, the fixing member is fixedly connected to the side of the battery panel, so that the fixing member can support and bear the battery panel. Then, one end of the support member is rotatably connected to the fixing member. One end of the connector is connected to the battery panel, and the other end of the connector is connected to the side of the connector. A part of the connector that is connected to the support member enables the part of the support member to be located between the two sides of the connector, so that the connector can restrict one end of the support member from moving away from the fixing member, so that the other end of the support member is stably supported on the contact surface, thereby improving a stability of the adjustment bracket and ensuring a normal use of the solar panel.

In some embodiments, the adjustment bracket includes a first mounting member and a second mounting member, where the first mounting member is provided at one end of the fixing member, the second mounting member is provided at the other end of the fixing member, the first mounting member is configured to fix one end of the fixing member to one end of the battery panel, and the second mounting member is configured to fix the other end of the fixing member to the other end of the battery panel.

In some embodiments, the adjustment bracket includes an adapter, one end of the adapter is fixedly connected to the support member, the other end of the adapter has a connection hole, and one end of the support member is rotatably provided in the connection hole.

In some embodiments, the support member includes a frame body and a first support rod, one end of the frame body is rotatably connected to the fixing member, and the first support rod is provided in the frame body; when the support member is in a deployed state, the connector surrounds the first support rod and contacts the first support rod so as to restrict one end of the support member from moving away from the fixing member.

In some embodiments, the support member includes a second support rod, and the second support rod is provided in the frame body and spaced apart from the first support rod; when the support member is in a storage state, the connector surrounds the second support rod and contacts the second support rod so as to restrict one end of the support member from moving away from the fixing member.

In some embodiments, the first support rod has a protrusion, and the protrusion is protruded in a direction of the adapter; when the support member is in the deployed state, the connector surrounds a part of the protrusion and contacts the part of the protrusion.

In some embodiments, the locking component includes a first locking piece and a second locking piece, the first locking piece and the second locking piece are spaced apart on the connector, the first locking piece is provided at one end of the connector away from the fixing member, the second locking piece is provided at one end of the connector that is close to the fixing member, and the first locking piece is connected to the second locking piece.

In some embodiments, there are a plurality of first locking pieces and a plurality of second locking pieces, the first locking pieces are arranged at intervals on the connector, the second locking pieces are arranged at intervals on the connector, and one first locking piece corresponds to one second locking piece.

In some embodiments, a clamping piece is provided on one side of the second mounting member facing away from the battery panel; when the support member is in a storage state, the clamping piece fixes one end of the support member away from the adapter on the second mounting member.

A solar panel according to an embodiment of the present disclosure includes a battery panel and the adjustment bracket, the adjustment bracket is connected to the battery panel.

In the above solar panel, the fixing member is fixedly connected to the side of the battery panel, so that the fixing member can support and bear the battery panel. Then, one end of the support member is rotatably connected to the fixing member, and one end of the connector is connected to the battery panel, and the other end of the connector is connected to the side of the connector. The part of the connector that is connected to the support member enables the part of the support member to be located between the two sides of the connector, so that the connector can restrict one end of the support member from moving away from the fixing member, so that the other end of the support member is stably supported on the contact surface, thereby improving the stability of the adjustment bracket and ensuring the normal use of the solar panel.

Additional aspects and advantages of the present disclosure will be partially presented in the following description, some of which will become apparent from the following description, or learned through practice of the present disclosure.

BRIEF DESCRIPTION OF DRAWINGS

The above and/or additional aspects and advantages of the present disclosure will become apparent and easy to understand from the description of the embodiments in combination with the following figures.

NUMERAL REFERENCE

Figure 1:
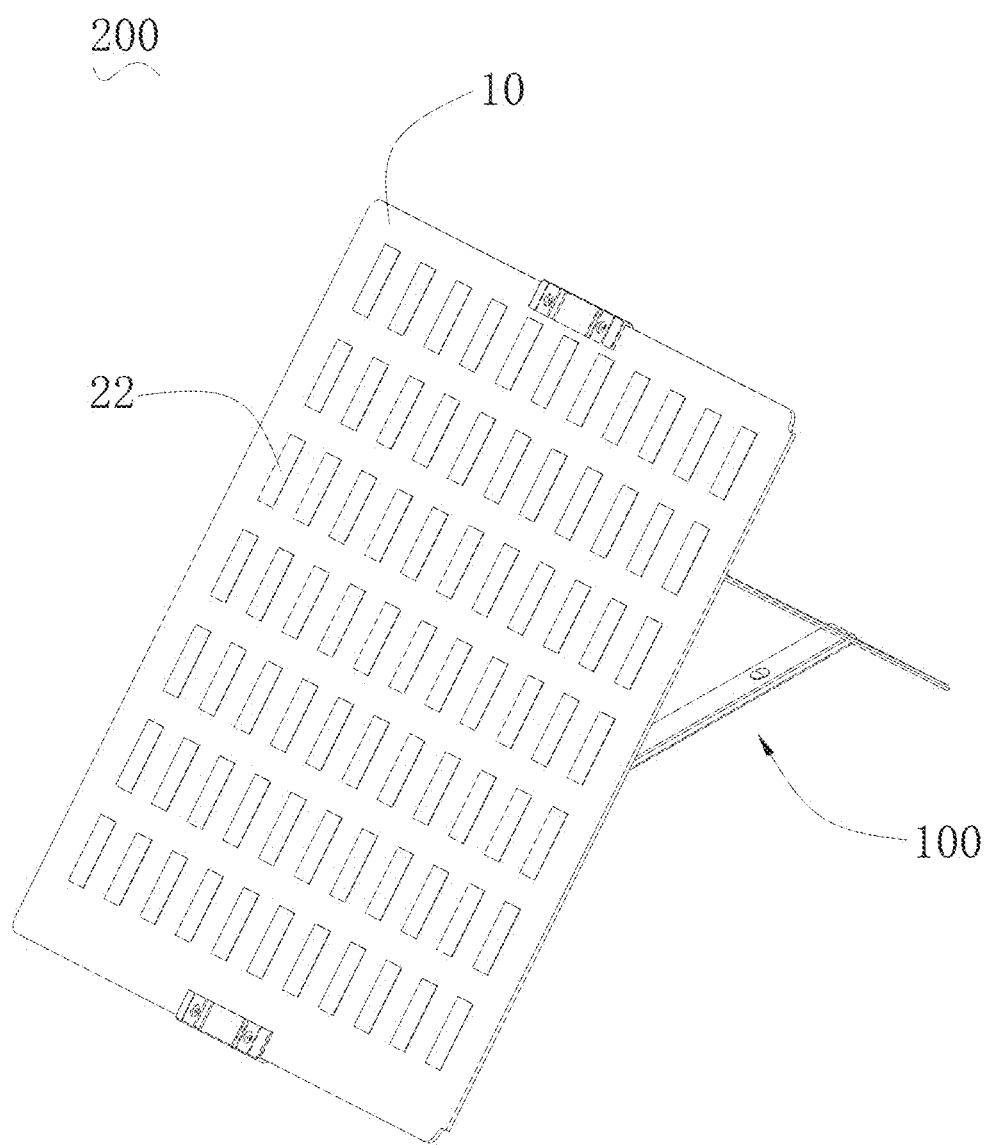
FIG. 1 is a first schematic structural diagram of a solar panel in a deployed state of an embodiment of the present disclosure.

100—adjustment bracket; 10—battery panel; 12—fixing member; 14—support member; 16—connector; 18—locking component; 20—contact surface; 22—battery piece; 24—first mounting member; 26—second mounting member; 28—adapter; 30—fixing hole; 32—fixing frame; 34—fixing rod; 36—connection hole; 38—frame body; 40—first support rod; 42—second support rod; 44—protrusion; 46 first locking piece; 48—second locking piece; 50—clamping piece; 52—fixing part; 54—clamping part; 56—first limiting element; 58—second limiting element; 200—Solar panel.

DESCRIPTION OF EMBODIMENTS

The following provides a detailed description of the embodiments of the present disclosure, examples of which are shown in the accompanying drawings, where the same or similar reference numerals from beginning to end represent the same or similar elements or elements with the same or similar functions. The embodiments described below with reference to the accompanying drawings are exemplary and are only used to explain the present disclosure, and should not be understood as limiting the present disclosure.

In a description of the present disclosure, it should be understood that terms "center", "longitudinal", "transverse", "length", "width", "thickness", "up", "down", "front", "back", "left", "right", "vertical", "horizontal", "top", "bottom", "inside", "outside", "clockwise", "counterclockwise" and other directional or positional relationships indicated are based on the directional or positional relationships shown in the accompanying drawings, and are only for the convenience of describing the present disclosure and simplifying the description, and do not indicate or imply that the device or component referred to must have a specific orientation, be constructed and operated in a specific orientation. Therefore, it cannot be understood as a limitation on the present disclosure. In the description of the present disclosure, the meaning of "connector" refers to two or more, unless otherwise specified.

In the description of the present disclosure, it should be noted that unless otherwise specified and limited, terms "installation", "connection to", and "connection with" should be broadly understood, for example, it can be a fixed connection, a detachable connection, or an integrated connection. It can be a mechanical connection or an electrical connection. It can be directly connected or indirectly connected through an intermediate medium, and it can be a connection within two components or an interaction relationship between two components. For those skilled in the art, specific meanings of the above terms in the present disclosure can be understood according to the specific situation.

In the present disclosure, unless otherwise specified and limited, a first feature above or below a second feature may include direct contact between the first and second features, or may include contact between the first and second features through another feature between them instead of direct contact. Besides that, the first feature being "above", "up", and "on" the second feature includes the first feature being directly above and diagonally above the second feature, or simply indicating that the first feature is horizontally higher than the second feature. The first feature being "below", "under", and "beneath" include the first feature being directly below and diagonally below the second feature, or simply indicating that the first feature has a lower horizontal height than the second feature.

The disclosure of this specification provides many different implementation modes or examples to achieve different structures of the present disclosure. In order to simplify the disclosure of the present disclosure, this specification describes the components and settings of specific examples. Of course, they are only examples and are not intended to limit the present disclosure. In addition, the present disclosure can repeat reference numbers and/or reference letters in different examples for the purpose of simplification and clarity, and does not indicate the relationship between the various embodiments and/or settings discussed. Furthermore, the present disclosure provides various specific examples of processes and materials, but those of those skill in the art may be aware of the application of other processes and/or the use of other materials.

Figure 2:
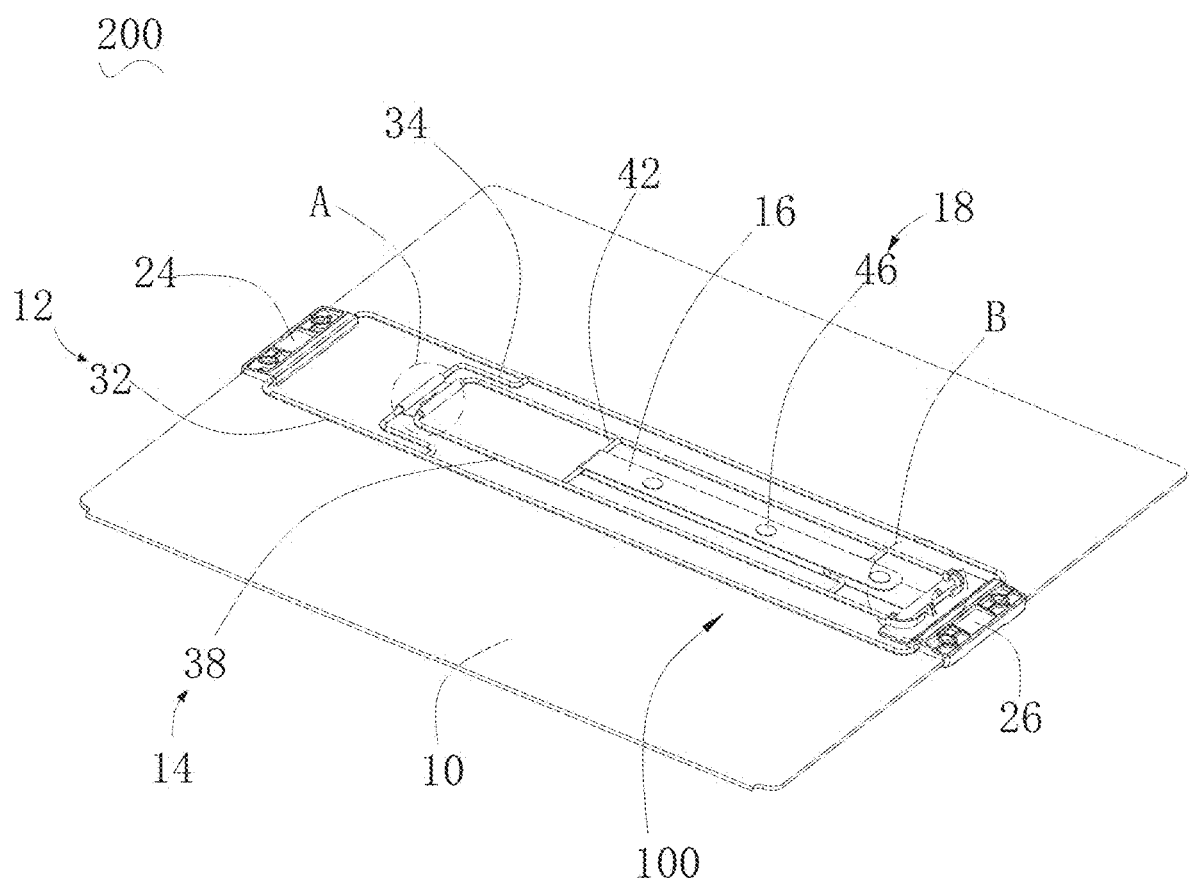
FIG. 2 is a schematic structural diagram of the solar panel in a storage state of an embodiment of the present disclosure.

Please refer to FIGS. 1 and 2, an adjustment bracket 100 for a solar panel 200 according to an embodiment of the present disclosure. The solar panel 200 includes a battery panel 10, and the adjustment bracket 100 includes a fixing member 12, a support member 14, a connector 16, and a locking component 18. The fixing member 12 is fixedly connected to one side of the battery panel 10. One end of the support member 14 is rotatably connected to the fixing member 12, and the other end of the support member 14 is supported on a contact surface 20. One end of the connector 16 is connected to the battery panel 10, and the other end of the connector 16 is connected to one side of the connector 16. A part of the connector 16 that is connected to the support member 14 enables a part of the support member 12 to be located between two sides of the connector 16. The connector 16 is configured to restrict one end of the support member 14 from moving away from the fixing member 12. The locking component 18 is provided on the connector 16, and the other end of the connector 16 is connected to one side of the connector 16 through the locking component 18.

In the above adjustment bracket 100, the fixing member 12 is fixedly connected to one side of the battery panel 10, so that the fixing member 12 can support and bear the battery panel 10. Then, one end of the support member 14 is rotatably connected to the fixing member 12, one end of the connector 16 is connected to the battery panel 10, and the other end of the connector 16 is connected to one side of the connector 16. The part of the connector 16 that is connected to the support member 14 enables the part of the support member 14 to be located between the two sides of the connector 16, so that the connector 16 can restrict one end of the support member 14 from moving away from the fixing member 12, so that the other end of the support member 14 is stably supported on the contact surface 20, thereby improving a stability of the adjustment bracket 100 and ensuring a normal use of the solar panel 200.

In an implementation mode, the fixing member 12, the support member 14, the connector 16, and the locking component 18 can all be provided on a back of the battery panel 10, and a front of the battery panel 10 can be provided with battery pieces 22. Two ends of the fixing member 12 are arranged near corresponding ends of the battery panel 10, and the fixing member 12 can be similar to a circular frame. One end of the support member 14 is rotatably connected to the fixing member 12, and the other end of the support member 14 is configured to support on the contact surface 20, and the contact surface 20 includes the ground.

One end of the connector 16 can be connected to the battery panel 10, and the other end of the connector 16 can surround a part of the support member 14 and abut against the part of the support member 14. The other end of the connector 16 can be connected to the side of the connector 16, so that the part of the support member 14 is located between the two sides of the connector 16, thereby restricting one end of the support member 14 supporting the contact surface 20 from moving away from the fixing member 12. That is to say, the fixing member 12 is fixedly connected to the side of the battery panel 10, the fixing member 12 can play a supporting and load-bearing role on the battery panel 10. Then, one end of the support member 14 is rotatably connected to the fixing member 12, one end of the connector 16 is connected to the battery panel 10, and the other end of the connector 16 is connected to the side of the connector 16. The part of the connector 16 that is connected to the support member 14 enables the part of the support member 14 to be located between the two sides of the connector 16, so that the connector 16 can restrict one end of the support member 14 from moving away from the fixing member 12, so that when the support member 14 is in a storage state, it can avoid shaking of the support member 14, and when the support member 14 is in an unfolded state, the other end of the support member 14 can be stably supported on the contact surface 20, thereby improving the stability of the adjustment bracket 100 and ensuring the normal use of the solar panel 200.

Figure 5:
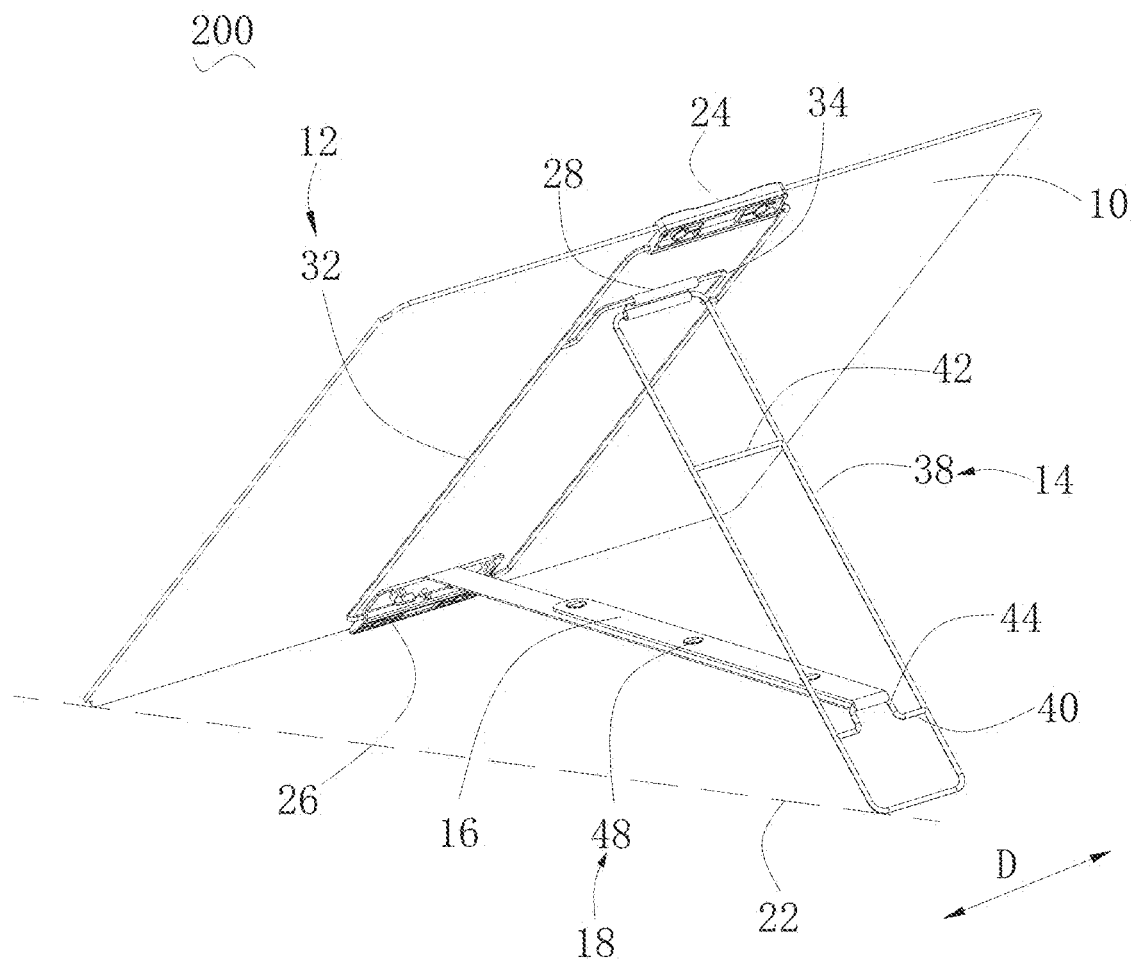
FIG. 5 is a second structural schematic diagram of the solar panel in the deployed state of an embodiment of the present disclosure.

Please refer to FIGS. 2 and 5. In an implementation mode, the adjustment bracket 100 includes a first mounting member 24 and a second mounting member 26. The first mounting member 24 is provided at one end of the fixing member 12, the second mounting member 26 is provided at the other end of the fixing member 12, the first mounting member 24 is configured to fix one end of the fixing member 12 at one end of the battery panel 10, and the second mounting member 26 is configured to fix the other end of the fixing member 12 at the other end of the battery panel 10.

In this way, the fixing member 12 can be fixedly provided on the side of the battery panel 10.

In an implementation mode, in FIG. 2, the first mounting member 24 and the second mounting member 26 are fixedly provided at two ends of the battery panel 10, respectively. The first mounting member 24 and the second mounting member 26 can be fixed and installed by screws or other means. In an implementation mode, the first mounting member 24 can fix one end of the fixing member 12 to one end of the battery panel 10, and the second mounting member 26 can fix the other end of the fixing member 12 to the other end of the battery panel 10, thereby fixing the fixing member 12 to the side of the battery panel 10.

In an implementation mode, one end of the connector 16 can be connected to the battery panel 10 and can be located between the second mounting member 26 and the battery panel 10. Or, in an implementation, one end of the connector 16 may also be connected to one end of the fixing member 12 and located between the second mounting member 26 and the battery panel 10.

Figure 3:
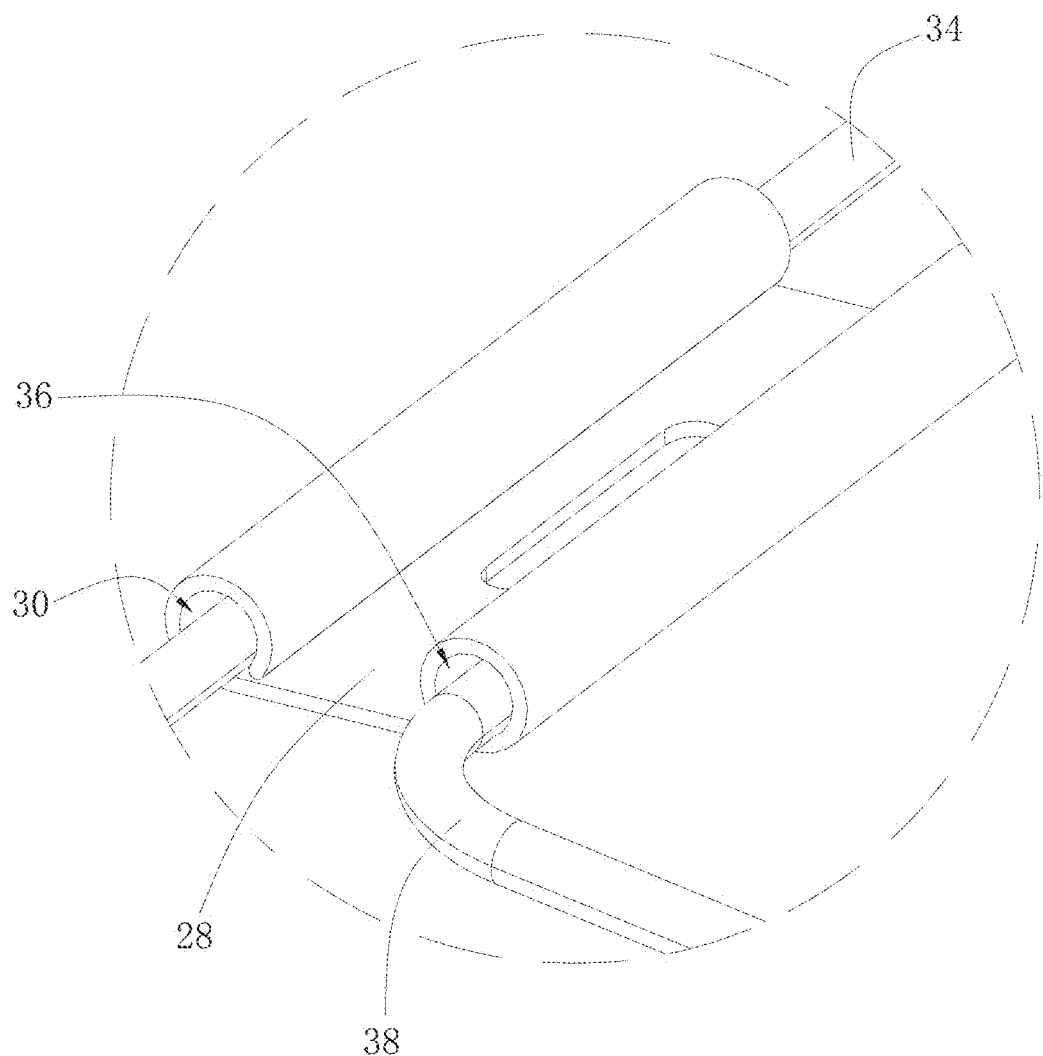
FIG. 3 is an enlarged view of part A in FIG. 2.

Please refer to FIGS. 2 and 3. In an implementation mode, the adjustment bracket 100 includes an adapter 28, one end of the adapter 28 is fixed to the support member 14, the other end of the adapter 28 is provided with a connection hole 36, and one end of the support member 14 is rotatably provided in the connection hole 36.

In this way, a rotational connection between the support member 14 and the fixing member 12 can be achieved.

In an implementation mode, in FIG. 3, one end of the adapter 28 can be wound to form a fixing hole 30. The fixing member 12 includes a fixing frame 32 and a fixing rod 34. The fixing frame 32 is fixedly connected to one side of the battery panel 10, and the fixing rod 34 is connected in the fixing frame 32. The fixing rod 34 is threaded through the fixing hole 30 and fixedly connected to the adapter 28. The other end of the adapter 28 can be wound to form the connection hole 36, and one end of the support member 14 can be threaded through the connection hole 36 and rotatably connected to the adapter 28. In an implementation mode, the fixing member 12 is fixedly connected to the adapter 28, and the support member 14 is rotatably connected to the adapter 28, thereby achieving the rotational connection between the support member 14 and the fixing member 12.

Please refer to FIGS. 2 and 5. In an implementation mode, the support member 14 includes a frame body 38 and a first support rod 40. One end of the frame body 38 is rotatably connected to the fixing member 12, and the first support rod 40 is provided in the frame body 38. When the support member 14 is in the deployed state, the connector 16 surrounds the first support rod 40 and abuts against the first support rod 40 so as to restrict one end of the support member 14 from moving away from the fixing member 12.

In this way, when the support member 14 is in the deployed state, the connector 16 surrounds the first support rod 40 and abuts against the first support rod 40, thereby restricting one end of the support member 14 from moving away from the fixing member 12.

In an implementation mode, in FIG. 2, the frame body 38 can have a ring shape, one end of the frame body 38 is rotatably connected to the adapter 28, and the adapter 28 is fixedly connected to the fixing rod 34, and the other end of the frame body 38 used for support on the contact surface 20. The first support rod 40 can be connected inside the frame body 38 and is supported to one end of the contact surface 20 that is close to the frame body 38. The connector 16 can surround the first support rod 40, and the connector 16 abuts against the first support rod 40. A part of the connector 16 can be folded in half. In an implementation mode, when the support member 14 is in the deployed state, the connector 16 surrounds the first support rod 40 and abuts against the first support rod 40. The part of the connector 16 can be folded in half, and the other end of the connector 16 can be connected to one side of the connector 16 through the locking component 18, thereby restricting one end of the support member 14 supporting contact surface 20 from moving away from the fixing member 12.

It should be noted that when the other end of the connector 16 is connected to the side of the connector 16 through the locking component 18, the part of the connector 16 is folded in half, thereby allowing the first support rod 40 to be located between the two sides of connector 16.

Please refer to FIGS. 2 and 5. In an implementation mode, the support member 14 includes a second support rod 42, and the second support rod 42 is provided within the frame body 38 and spaced apart from the first support rod 40. When the support member 14 is in the storage state, the connector 16 surrounds the second support rod 42 and abuts against the second support rod 42 so as to restrict one end of the support member 14 from moving away from the fixing member 12.

In this way, when the support member 14 is in the storage state, the connector 16 can surround the second support rod 42 and abuts against the second support rod 42, thereby restricting one end of the support member 14 from moving away from the fixing member 12, thereby preventing the support member 14 from shaking.

In an implementation mode, the second support rod 42 is connected within the frame body 38 and is connected to one end of the adapter 28 that is close to the frame body 38. In an implementation mode, when the support member 14 is in the storage state, the connector 16 can surround the second support rod 42 and abuts against the second support rod 42. The part of the connector 16 can be folded in half, and the other end of the connector 16 can be connected to the side of the connector 16 through the locking component 18, thereby restricting one end of the support member 14 supporting the contact surface 20 from moving away from the fixing member 12, thereby preventing the support member 14 from shaking.

Please refer to FIG. 5. In an implementation mode, the first support rod 40 has a protrusion 44 that is protruded towards a direction of the adapter 28. When the support member 14 is in the deployed state, the connector 16 surrounds the part of the protrusion 44 and contacts the part of the protrusion 44.

In this way, it can prevent the connector 16 from moving along a width direction D of the support member 14 on the first support rod 40.

In an implementation mode, in FIG. 5, a middle position of the first support rod 40 can be bent to form the protrusion 44, and the protrusion 44 can be raised towards the direction of the adapter 28. In an implementation mode, when the support member 14 is in the deployed state, the connector 16 can surround the part of the protrusion 44 and abut against the part of the protrusion 44, and a remaining part of the protrusion 44 can prevent the connector 16 from moving along the width direction D of the support member 14 on the first support rod 40.

Please refer to FIGS. 2 and 5. In an implementation mode, the locking component 18 includes a first locking piece 46 and a second locking piece 48. The first locking piece 46 and the second locking piece 48 are spaced apart on the connector 16. The first locking piece 46 is provided at one end of the connector 16 away from the fixing member 12, and the second locking piece 48 is provided at one end of the connector 16 near the fixing member 12. The first locking piece 46 is connected to the second locking piece 48.

In this way, the support member 14 can be further fixed by connecting the first locking piece 46 to the second locking piece 48.

In an implementation mode, the first locking piece 46 includes a female button, and the second locking piece 48 includes a sub button. The first locking piece 46 and the second locking piece 48 are spaced apart on the connector 16. The first locking piece 46 is provided at one end of the connector 16 away from the fixing member 12, and the second locking piece 48 is provided at one end of the connector 16 near the fixing member 12. In an implementation mode, when the support member 14 is in the deployed state, the connector 16 surrounds the first support rod 40 and abuts against the first support rod 40. The other end of the connector 16 can be connected to the second locking piece 48 through the first locking piece 46 so as to connect to the side of the connector 16, thereby restricting one end of the support member 14 supporting the contact surface 20 to move away from the fixing member 12. In an implementation mode, when the support member 14 is in the storage state, the connector 16 surrounds the second support rod 42 and abuts against the second support rod 42. The other end of the connector 16 can be connected to the second locking piece 48 through the first locking piece 46 so as to connect to the side of the connector 16, thereby restricting one end of the support member 14 supporting the contact surface 20 from moving away from the fixing member 12.

Please refer to FIGS. 2 and 5. In an implementation mode, there are a plurality of first locking pieces 46 and a plurality of second locking pieces 48. The first locking pieces 46 are provided at intervals on the connector 16, and the second locking pieces 48 are provided at intervals on the connector 16. One first locking piece 46 corresponds to one second locking piece 48.

In this way, the support member 14 can be reinforced.

In an implementation mode, there are three first locking pieces 46 and three second locking pieces 48. The three first locking pieces 46 are provided at intervals on the connector 16, and the three second locking pieces 48 are provided at intervals on the connector 16. One first locking piece 46 corresponds to one second locking piece 48. In an implementation mode, by providing a plurality of first locking pieces 46 and a plurality of second locking pieces 48, one first locking piece 46 is correspondingly connected to one second locking piece 48, thereby reinforcing and locking the support member 14 and restricting one end of the support member 14 supporting the contact surface 20 from moving away from the fixing member 12.

Figure 4:
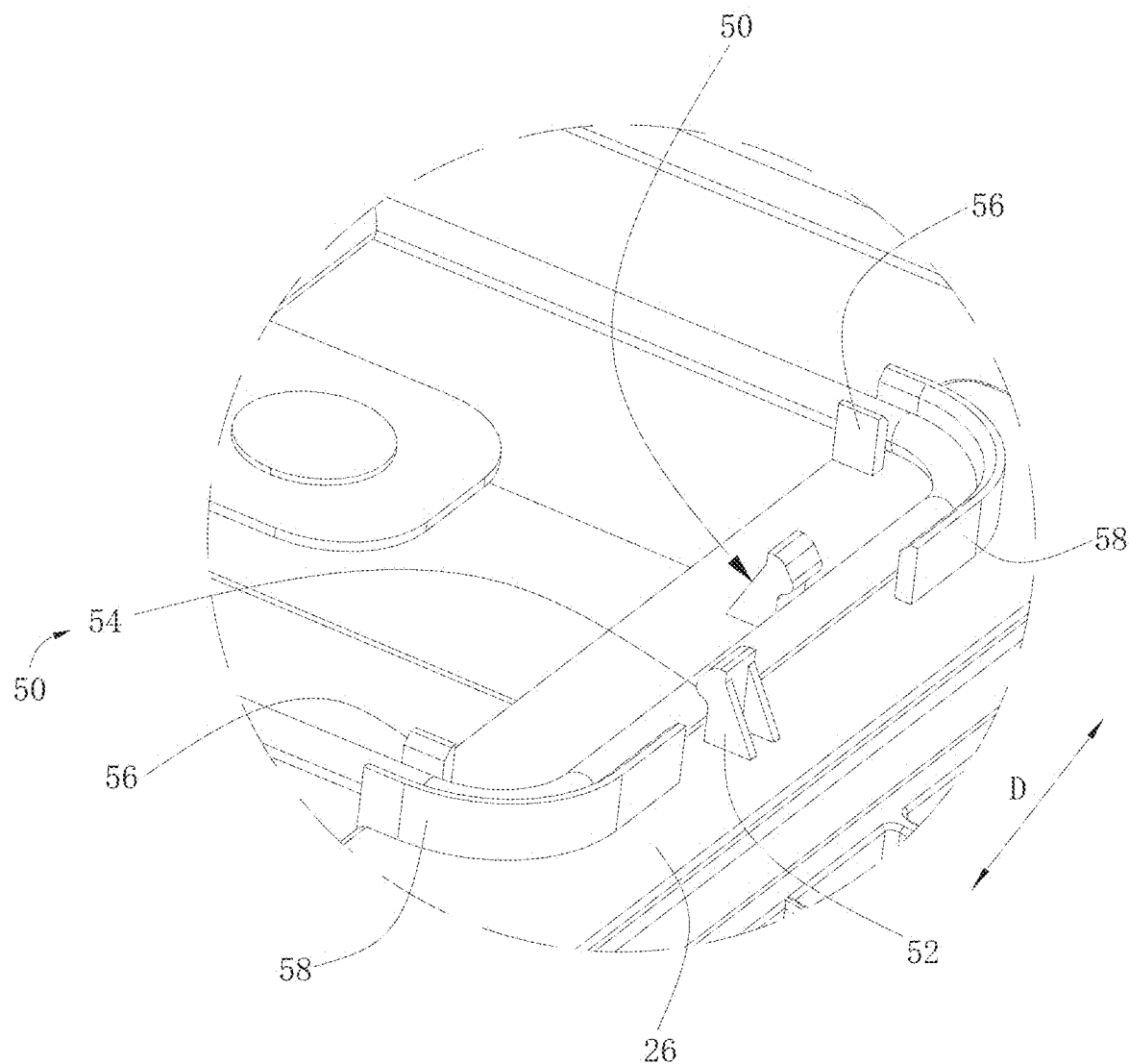
FIG. 4 is an enlarged view of part B in FIG. 2.

Please refer to FIGS. 2 and 4. In an implementation mode, a clamping piece 50 is provided on one side of the second mounting member 26 facing away from the battery panel 10. When the support member 14 is in the storage state, the clamping piece 50 fixes one end of the support member 14 away from the adapter 28 on the second mounting member 26.

In this way, when the support member 14 is in the storage state, one end of the support member 14 away from the adapter 28 can be further fixed to the second mounting member 26 through the clamping piece 50, thereby restricting the end of the support member 14 supporting the contact surface 20 from moving away from the fixing member 12.

In an implementation mode, in FIG. 4, the clamping piece 50 is provided on one side of the second mounting member 26 facing away from the battery panel 10. The clamping piece 50 has a fixing part 52 and a clamping part 54. The fixing part 52 is connected to the second mounting plate, and the clamping part 54 is protruded from one side of the fixing part 52. In an implementation mode, during a transition of the support member 14 from the unfolded state to the storage state, one end of the support member 14 supporting the contact surface 20 can first contact one side of the clamping part 54, and then slide into a lower part of the clamping part 54 from the side of the clamping part 54, and then one end of the support member 14 is fixed on the second mounting plate through the clamping part 54, thereby restricting one end of the support member 14 supporting the contact surface 20 away from the fixing member 12.

In an implementation mode, in FIG. 4, there can be two clamping pieces 50 arranged in a staggered manner. When the support member 14 is in the storage state, one clamping piece 50 is located on one side of the support member 14 supporting the contact surface 20, and the other clamping piece 50 is located on the other side of the support member 14 supporting the contact surface 20. The second mounting member 26 is further provided with a first limiting element 56 and a second limiting element 58. The first limiting element 56 is cylindrical, and the second limiting element 58 can be arc shape. The first limiting element 56 and the second limiting element 58 can limit one end of the support member 14 supporting the contact surface 20 to move along the width direction D of the support member 14.

Please refer to FIGS. 5-8. A solar panel 200 according to an embodiment of the present disclosure includes a battery panel 10 and the adjustment bracket 100. The adjustment bracket 100 is connected to the battery panel 10.

In the above-mentioned solar panel 200, the fixing member 12 is fixedly connected to one side of the battery panel 10, so that the fixing member 12 can support and bear the battery panel 10. Then, one end of the support member 14 is rotatably connected to the fixing member 12, one end of the connector 16 is connected to the battery panel 10, and the other end of the connector 16 is connected to one side of the connector 16. A part of the connector 16 that is connected to the support member 14 enables a part of the support member 14 to be located between two sides of the connector 16, so that the connector 16 can restrict one end of the support member 14 from moving away from the fixing member 12, so that the other end of the support member 14 is stably supported on the contact surface 20, and improve the stability of the adjustment bracket 100 and ensures a normal use of solar panel 200.

Figure 6:
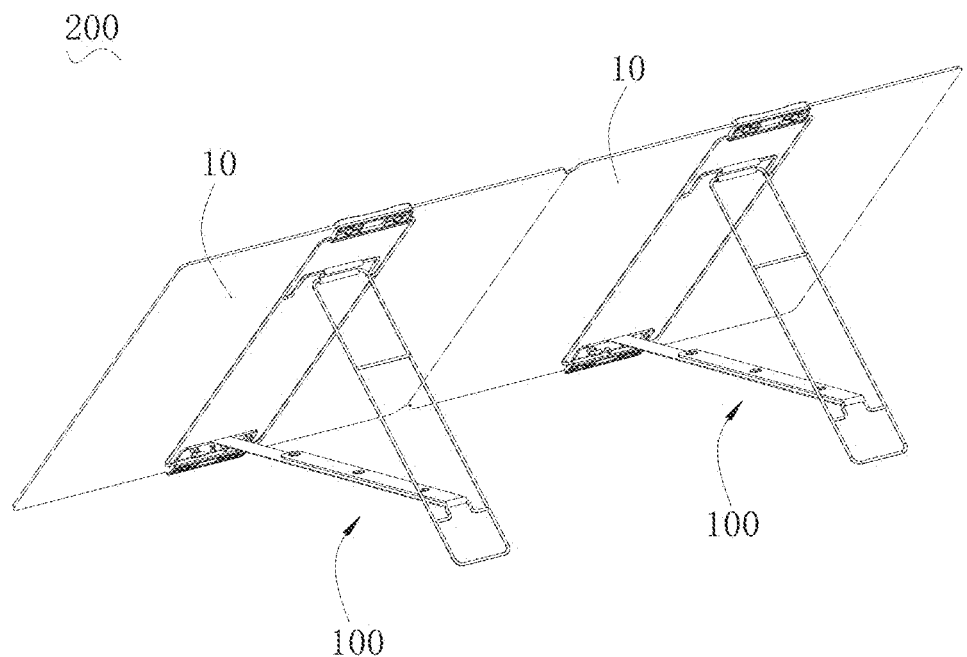
FIG. 6 is a third schematic diagram of the deployed state of the solar panel in an embodiment of the present disclosure.
Figure 7:
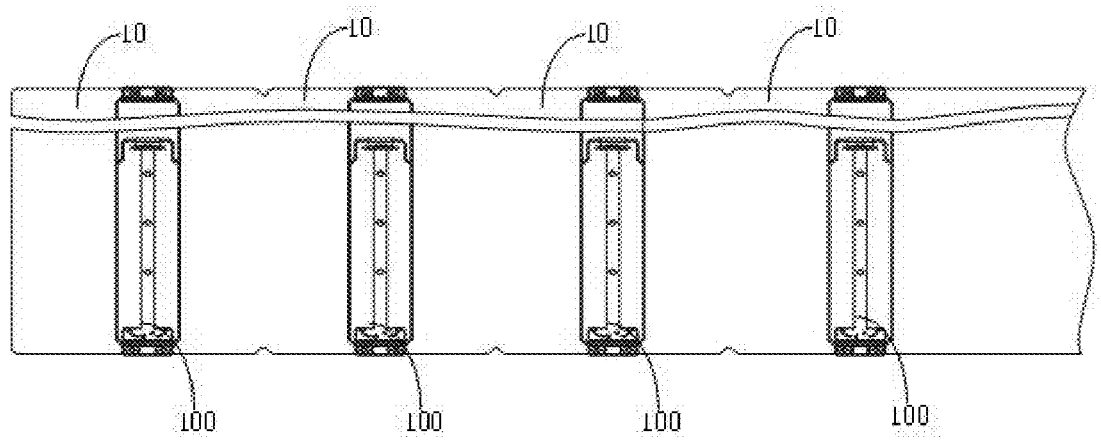
FIG. 7 is a first schematic diagram of an operation of the solar panel according to an embodiment of the present disclosure.
Figure 8:
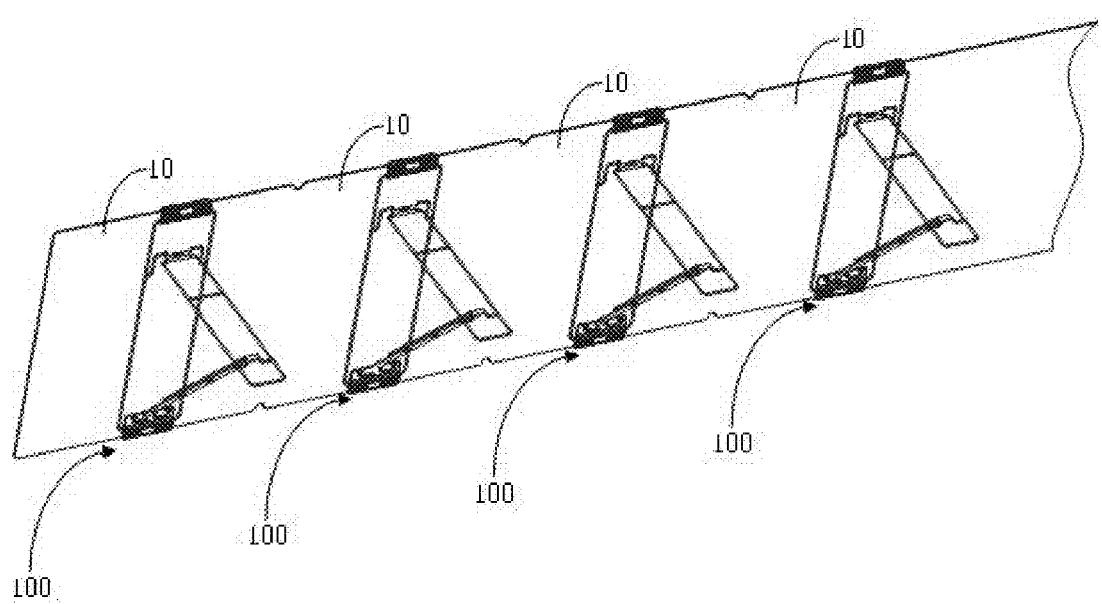
FIG. 8 is a second schematic diagram of the operation of the solar panel according to an embodiment of the present disclosure.

In an implementation mode, the solar panel 200 includes a flexible solar panel, and a front of the battery panel 10 is provided with battery pieces 22. In FIG. 5, the solar panel 200 can be provided with one battery panel 10, and the adjustment bracket 100 is connected to a back of the battery panel 10. In FIG. 6, the solar panel 200 can be provided with a plurality of battery panels 10, and the battery panels 10 can be folded in sequence. The back of each battery panel 10 can be connected to the adjustment bracket 100.

In an implementation mode, the fixing member 12 is fixedly connected to one side of the battery panel 10, so that the fixing member 12 can support and bear the battery panel 10. Then, one end of the support member 14 is rotatably connected to the fixing member 12, one end of the connector 16 is connected to the battery panel 10, and the other end of the connector 16 is connected to the side of the connector 16. The part of the connector 16 that is connected to the support member 14 enables the part of the support member 14 to be located between two sides of the connector 16, so that the connector 16 can restrict one end of the support member 14 from moving away from the fixing member 12, so that the other end of the support member 14 is stably supported on the contact surface 20, thereby improving the stability of the adjustment bracket 100 and ensuring the normal use of the solar panel 200.

In the description of this specification, the reference terms "one embodiment", "some embodiments", "illustrative embodiments", "examples", "specific examples", or "some examples" refer to the specific features, structures, materials, or characteristics described in combination with the embodiments or examples included in at least one embodiment or example of the present disclosure. In this specification, the illustrative expressions of the above terms may not necessarily refer to the same implementation or examples. Moreover, the specific features, structures, materials, or characteristics described can be combined in any one or more embodiments or examples in a suitable manner.

Although the embodiments of the present disclosure have been shown and described, those skilled in the art can understand that various changes, modifications, substitutions, and variations can be made to these embodiments without departing from the principles and purposes of the present disclosure. The scope of the present disclosure is limited by the claims and their equivalents.

What is claimed is:

1. An adjustment bracket for solar panel, wherein the solar panel comprises a battery panel, and the adjustment bracket comprises:
   a fixing member, which is fixedly connected to one side of the battery panel;
   a support member, one end of the support member is rotatably connected to the fixing member, and an other end of the support member is supported on a contact surface;
   a connector, one end of the connector is connected to the battery panel; a part of the support member that is connected to the fixing member enable a part of the support member to be located between two sides of the connector; the connector is configured to restrict the one end of the support member from moving away from the fixing member;
   a locking component, which is provided on the connector.

2. The adjustment bracket according to claim 1, wherein the adjustment bracket comprises a first mounting member and a second mounting member,
   wherein the first mounting member is provided at one end of the fixing member, the second mounting member is provided at an another end of the fixing member,
   the first mounting member is configured to fix the one end of the fixing member to one end of the battery panel, and the second mounting member is configured to fix the another end of the fixing member to the other end of the battery panel.

3. The adjustment bracket according to claim 2, wherein the adjustment bracket comprises an adapter, one end of the adapter is fixedly connected to the support member, the other end of the adapter has a connection hole, and one end of the support member is rotatably provided in the connection hole.

4. The adjustment bracket according to claim 3, wherein the support member comprises a frame body and a first support rod,
   one end of the frame body is rotatably connected to the fixing member, and the first support rod is provided in the frame body;

when the support member is in a deployed state, the connector surrounds the first support rod and contacts the first support rod so as to restrict one end of the support member from moving away from the fixing member.

5. The adjustment bracket according to claim 4, wherein the support member comprises a second support rod, and the second support rod is provided in the frame body and spaced apart from the first support rod;

when the support member is in a storage state, the connector surrounds the second support rod and abuts against the second support rod so as to restrict one end of the support member from moving away from the fixing member.

6. The adjustment bracket according to claim 4, wherein the first support rod has a protrusion, and the protrusion is protruded in a direction of the adapter;

when the support member is in the deployed state, the connector surrounds a part of the protrusion and abuts against the part of the protrusion.

7. The adjustment bracket according to claim 1, wherein the locking component comprises a first locking piece and a second locking piece, the first locking piece and the second locking piece are spaced apart on the connector, the first locking piece is provided at one end of the connector away from the fixing member, the second locking piece is provided at one end of the connector that is close to the fixing member, and the first locking piece is connected to the second locking piece.

8. The adjustment bracket according to claim 7, wherein there are a plurality of first locking pieces and a plurality of second locking pieces, the first locking pieces are arranged at intervals on the connector, the second locking pieces are arranged at intervals on the connector, and one first locking piece corresponds to one second locking piece.

9. The adjustment bracket according to claim 3, wherein a clamping piece is provided on one side of the second mounting member facing away from the battery panel;

when the support member is in a storage state, the clamping piece fixes one end of the support member away from the adapter on the second mounting member.

10. A solar panel, comprising a battery panel and the adjustment bracket according to claim 1, wherein the adjustment bracket is connected to the battery panel.

* * * * *